United States Patent Office 2,889,310
Patented June 2, 1959

2,889,310

POLYMER COMPOSITIONS

Victor Denis Tughan, Welwyn, England, assignor to Imperial Chemical Industries Limited, Millbank, London, England, a corporation of Great Britain No Drawing. Application May 28, 1957
Serial No. 661,997

Claims priority, application Great Britain June 15, 1956

5 Claims. (Cl. 260—45.9)

This invention relates to improved polymer compositions and in particular to polymer compositions containing a light-stabiliser.

We have found that the discolouration and embrittlement normally observed on exposing polymeric materials derived from one or more compounds containing a $CH_2=C<$ group to light is greatly reduced if the polymeric material is other than an aliphatic hydrocarbon and contains a minor proportion of p-bis-(4-phenyl-2:3-diazabuta-1:3-dienyl)benzene.

According to the present invention, therefore, we provide a composition comprising a polymeric material which is other than an aliphatic hydrocarbon and which is derived from one or more compounds containing a $CH_2=C<$ group and a minor proportion of p-bis-(4-phenyl-2:3-diazabuta-1:3-dienyl)benzene.

p-bis-(4 - phenyl-2:3-diazabuta-1:3-dienyl)benzene has the formula:

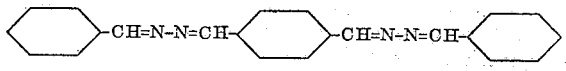

and is most conveniently made by reacting together terephthalaldehyde and benzaldehyde hydrazone. For convenience, this compound is hereinafter referred to as "terazine."

Examples of polymeric materials coming within the scope of the invention include polymethyl methacrylate, polyvinyl acetate, polystyrene and especially chlorine-containing polymeric materials, such as polymers of vinyl chloride and of vinylidene chloride, copolymers of these compounds with each other and with other unsaturated compounds, such as vinyl esters, e.g. vinyl acetate, acrylonitrile and dialkyl fumarates, e.g. diethyl fumarate, "after-chlorinated" products of such chlorine-containing polymers and copolymers, and chlorinated polymers and copolymers of unsaturated compounds containing no chlorine atoms, e.g. polymers of ethylene, vinyl esters and vinyl ethers.

The amount of "terazine" employed in compositions according to the present invention will depend upon the nature of the polymeric material. For example, the amount used in vinyl chloride polymer and copolymer compositions will usually lie between about 0.02 and 2% by weight of the polymeric material in order to obtain an effective light-stabilizing action. The amount used in such compositions will preferably lie between 0.1 and 1.0% by weight since below 0.1% the stabilising effect falls off and above 1% little further advantage is gained. On the other hand, the amount used in polymethyl methacrylate, for example, will usually be less than about 0.02% by weight of the polymeric material.

The "terazine" may be incorporated in the monomeric material from which the polymeric material is derived before the monomeric material is polymerised. Owing to the retarding effect of "terazine" on polymerisation reactions, however, it is preferred if possible to add it to the polymeric material after polymerisation. Any convenient method which ensures intimate mixing may be used to incorporate the "terazine" in the polymeric material.

"Terazine" may be incorporated in polymethyl methacrylate, for example, by adding it to the monomeric material or to the partly polymerised material or to a solution of polymethyl methacryalte in the monomeric material and then completing the polymerisation.

In a convenient method for the production of compositions from polyvinyl chloride, the polymer and "terazine" together with any other desired ancillary ingredients such as plasticisers, lubricants, fillers and heat-stabilisers are first blended uniformly by agitation in a Gardner mixer. The batch is next masticated at elevated temperature, e.g. in a Banbury mixer and is then transferred to a roll mill where the mixing is completed and the composition is converted into a sheet or crepe. The crepe thus obtained may be disintegrated to form a moulding powder or may, for example, be fed to a calender and converted into a film or foil.

Other methods of incorporating "terazine" in polymeric materials will readily suggest themselves. For example, if the polymeric material is to be used in the production of films, sheets, coatings or the like by casting a solution of the polymeric material on to a support and removing the solvent, the "terazine" may be incorporated by adding it to the solution of the polymeric material. "Terazine" may also be added to an aqueous dispersion of the polymeric material, e.g. to a polyvinyl chloride latex.

The use of "terazine" as a light stabiliser is of particular value in connection with polyvinyl chloride and vinyl chloride/vinyl acetate copolymer compositions, especially unplasticised compositions intended for fabrication into sheets that are transparent or semi-transparent or have light colours. Thin sheets may be made from such compositions by calendering or by extrusion. Thicker sheets may be made by laminating a number of such thin sheets together under the influence of heat and pressure; alternatively, an extrusion technique can be used for the production of thicker sheets also.

The following example illustrates the preparation of "terazine."

EXAMPLE I 93 gms. of a 60% w./v. solution of hydrazine hydrate were mixed with 900 mls. water and refluxed with stirring. 45 gms. benzaldazine were added slowly to the boiling solution. After the yellow colour of the azine had completely disappeared, formation of the hydrazone was assumed to be complete. 36 gms. of a buff-coloured, viscous oil separated and were shaken with water to remove traces of hydrazine hydrate. Since the oil tended to form an emulsion with the water it was extracted with ether and the ether then removed by distillation. 26.8 gms. of the hydrazone were thus obtained and were taken up in 50 mls. of 20% aqueous ethanol. 13.4 gms. of terephthal-aldehyde dissolved in 250 mls. ethanol were added over a period of 5 hours to the vigorously stirred hydrazone solution. The resulting pale yellow azine was filtered and well washed with cold water. The yield based on benzaldazine was 30 gms. (88%). The crude azine was crystallised three times from benzene to give pale yellow needles, melting point 211 to 215° C. Analysis indicated C, 78.1; H, 5.4; N, 16.6; in agreement with the calculated values for a compound of formula $C_{22}H_{18}N_4$.

Our invention is illustrated but not limited by the following examples in which all parts are by weight.

EXAMPLE II

A range of compositions comprising polyvinyl chloride, a heat stabiliser and "terazine" were prepared. Compositions containing no light-stabiliser and others in which salol a known light-stabiliser was substituted for "terazine" were also prepared.

The constitution of the various compositions is indicated in Table I, all parts being by weight. The polyvinyl chloride was made by suspension polymerisation and had a K-value of 55, as determined by the method described by Fikentscher in Cellulosechemie, 13, (1932), pp. 58 et seq., using ethylene dichloride as solvent. The heat-stabiliser used was "Thermolite 31," a thio-organo tin compound sold by Metal and Thermit Corporation, New York, U.S.A.

The compositions were made by stirring the ingredients together and then transferring the mixture to a roll-mill with two horizontally disposed, steam-heated rolls. Temperatures of 170° C. and 160° C. were used for the front and back rolls respectively. The width of the nip between the rolls was adjusted to give a crepe approximately 0.07 inch thick.

The mixture was added with the rolls stationary and the rolls started within 5 seconds. Mixture falling through the rolls was collected and returned to the nip. The crepe was cut and folded over continuously for the duration of the rolling to ensure thorough mixing. The crepe was removed from the rolls after 3 minutes and a piece pressed between polished flat metal plates in a Turner press. The moulding thus obtained was 1/16 inch thick and from it a sample measuring 1 inch x 1/2 inch was cut.

Samples prepared as described above were exposed continuously to ultra-violet light in an "Agemaster" accelerated-weathering testing apparatus. Readings were taken, at intervals, of the optical density of the samples in the violet 621 (Ilford Bright Spectrum Filter Series) wave-length region and are reproduced in Table I. The optical densities are expressed as percentages and 100 corresponds to zero light transmission at this wave-length.

*Table I*

| Composition | Ingredients other than 100 parts polyvinyl chloride and 2 parts heat stabiliser | Optical density in violet 621 after exposure in weathering apparatus for— | | | | |
|---|---|---|---|---|---|---|
| | | 0 hour | 264 hours | 454 hours | 772 hours | 1,009 hours |
| 1 | 0.02% "terazine" | 15 | 29 | 39 | 53 | 95 |
| 2 | 0.05% "terazine" | 18 | 26 | 37 | 50 | 95 |
| 3 | 0.1% "terazine" | 14½ | 21 | 31 | 44 | 85 |
| 4 | 0.25% "terazine" | 19 | 22 | 31 | 45 | 78 |
| 5 | 0.5% "terazine" | 22 | 24 | 33 | 45 | 75 |
| 6 | 0.5% salol | 12½ | 19 | 35.5 | 83.5 | >100 |
| 7 | None | 11 | 29 | 48 | >100 | >100 |

It will be appreciated that compositions 6 and 7 in Table I are not within the scope of the invention; figures relating to these compositions are included simply for purposes of comparison.

EXAMPLE III

Monomeric methyl methacrylate was saturated with "terazine," the final concentration being approximately 0.01% by weight. After filtration, 0.1% benzoyl peroxide was added and the monomer thickened to a syrupy consistency by heating at 80 to 90° C. After evacuation to remove dissolved air, the syrup was poured into a cell formed by two glass plates separated by a resilient gasket arranged around the perimeter of the plates. The syrup was polymerised at 52° C. to give a sheet approximately 0.25 inch thick. The sheet was separated from the glass by heating in a water bath at 98° C. for three hours. A similar sheet containing no "terazine" was also made.

The sheet containing "terazine" was markedly yellow but after 330 hours continuous exposure to ultra-violet light in an "Agemaster" accelerated-weathering testing apparatus had changed little and was only slightly more yellow than the sheet containing no "terazine" which had been colourless originally. The degradation of the polymer was followed by determining the "intrinsic viscosity" by measuring the flow time in an Ostwald No. 1 viscometer of an 0.1% solution in chloroform at 20° C. Before accelerated ageing, the "intrinsic viscosity" of the sample containing "terazine" was 8.72 while the blank was 11.4. After 330 hours of accelerated ageing, the values were 4.40 and 2.32 respectively.

I claim:

1. A composition of matter consisting essentially of (1) polymeric materials selected from the class consisting of polymers of methylmethacrylate, vinyl acetate, styrene, vinyl chloride, vinylidene chloride and chlorinated polymers of ethylene, and (2) a light-stabilizing amount of p-bis-(4-phenyl-2:3-diazabuta-1:3-dienyl) benzene.

2. A composition according to claim 1 in which the polymeric material is a vinyl chloride polymer.

3. A composition according to claim 2 in which the proportion of p-bis-(4-phenyl-2:3-diazabuta-1:3-dienyl) benzene is between 0.02 and 2% by weight of the vinyl chloride polymer.

4. A composition according to claim 1 in which the polymeric material is polymethyl methacrylate.

5. A composition according to claim 4 in which the proportion of p-bis-(4-phenyl-2:3-diazabuta-1:3-dienyl) benzene is less than 0.02% by weight of polymethyl methacrylate.

References Cited in the file of this patent
UNITED STATES PATENTS
2,520,339   Robertson _____ Aug. 29, 1950